United States Patent
Themereau

(10) Patent No.: US 10,594,644 B2
(45) Date of Patent: Mar. 17, 2020

(54) METHODS FOR DELIVERING ELECTRONIC MAILS ON REQUEST, ELECTRONIC MAIL SERVERS AND COMPUTER PROGRAMS IMPLEMENTING SAID METHODS

(71) Applicant: STREAMWIDE, Paris (FR)

(72) Inventor: Vincent Themereau, Paris (FR)

(73) Assignee: STREAMWIDE, Paris (FR)

( * ) Notice: Subject to any disclaimer, the term of this patent is extended or adjusted under 35 U.S.C. 154(b) by 0 days.

(21) Appl. No.: 15/451,883

(22) Filed: Mar. 7, 2017

(65) Prior Publication Data

US 2017/0180296 A1 Jun. 22, 2017

Related U.S. Application Data

(63) Continuation of application No. 14/403,445, filed as application No. PCT/FR2013/051194 on May 29, 2013, now abandoned.

(30) Foreign Application Priority Data

May 31, 2012 (FR) ...................................... 12 55029

(51) Int. Cl.
H04L 12/58 (2006.01)
(52) U.S. Cl.
CPC ............ *H04L 51/22* (2013.01); *H04L 51/066* (2013.01)
(58) Field of Classification Search
CPC ....... H04L 51/18; H04L 51/22; H04L 51/063; H04L 12/58; H04L 12/585; H04L 12/581;
(Continued)

(56) References Cited

U.S. PATENT DOCUMENTS 5,937,164 A * 8/1999 Mages .................... G06F 21/10
375/E7.025
8,291,032 B2 10/2012 Lamb et al.
(Continued)

FOREIGN PATENT DOCUMENTS

EP 2 144 409 B1 8/2010
EP 2 257 004 A1 12/2010
(Continued)

OTHER PUBLICATIONS

French Search Report and Written Opinion dated Feb. 25, 2013 for Application No. FR 1255029, 8 pgs.

*Primary Examiner* — Philip J Chea
*Assistant Examiner* — Mehulkumar J Shah
(74) *Attorney, Agent, or Firm* — Frost Brown Todd LLC

(57) ABSTRACT

Method for delivering electronic mails on request from an electronic mail server to at least one remote client via an internet network, said method being characterized in that said electronic mail server exchanges data with at least one storage server and in that it comprises a delivery step comprising the operations of:
  receiving, from a remote client, on the electronic mail server, a request for delivery of an electronic mail identified by an electronic mail identifier;
  obtaining, from at least one storage server, data to be encapsulated and message attribute data associated with the electronic mail identifier;
  generating an identified electronic mail from the data to be encapsulated and the message attribute data; and
  transmitting the identified electronic mail to the remote client.

10 Claims, 3 Drawing Sheets

(58) Field of Classification Search
CPC .. H04L 12/5855; H04L 51/066; G06Q 10/107
USPC ................ 709/206, 204; 379/93.01; 370/260
See application file for complete search history.

(56) References Cited

U.S. PATENT DOCUMENTS

| | | | | |
|---|---|---|---|---|
| 8,554,939 | B1* | 10/2013 | Tong | G06F 3/04817 |
| | | | | 370/338 |
| 9,130,780 | B2 | 9/2015 | Fan et al. | |
| 9,392,119 | B2 | 7/2016 | Christophe | |
| 2001/0034771 | A1* | 10/2001 | Hutsch | G06F 9/541 |
| | | | | 709/217 |
| 2006/0218234 | A1* | 9/2006 | Deng | H04L 51/066 |
| | | | | 709/206 |
| 2007/0156825 | A1* | 7/2007 | McCarthy | G06Q 10/107 |
| | | | | 709/206 |
| 2008/0189275 | A1* | 8/2008 | Matsumoto | H04L 51/066 |
| 2010/0306329 | A1* | 12/2010 | Kinoshita | H04L 51/066 |
| | | | | 709/206 |
| 2012/0136953 | A1* | 5/2012 | Lamb | G06Q 10/10 |
| | | | | 709/206 |
| 2014/0122228 | A1* | 5/2014 | Wical | G06Q 30/02 |
| | | | | 705/14.53 |
| 2015/0156155 | A1 | 6/2015 | Themereau | |

FOREIGN PATENT DOCUMENTS

| | | |
|---|---|---|
| JP | 2000-270013 A | 9/2000 |
| JP | 2010-278484 A | 12/2010 |

* cited by examiner

METHODS FOR DELIVERING ELECTRONIC MAILS ON REQUEST, ELECTRONIC MAIL SERVERS AND COMPUTER PROGRAMS IMPLEMENTING SAID METHODS

This application is a continuation of U.S. patent application Ser. No. 14/403,445, Themereau, filed Nov. 24, 2014, which is a U.S. national entry of PCT Patent Application No. PCT/FR2013/051194, filed May 29, 2013.

The present invention relates to electronic mail servers and to methods for delivering electronic mails on request to remote clients, for example mobile terminals connected to an Internet network.

More particularly, the invention relates to a method for delivering electronic mails on request from an electronic mail server to at least one remote client via an internet network.

With the development and diversification of electronic terminals, a user of today may need to access his mailbox of electronic mail from a computer, a mobile terminal, a mobile phone, a tablet with touchscreen, or any other device capable of communicating with an internet network. These remote clients have varied computing capabilities, storage, and displays and they use multiple communication protocols. They also have internet network connections which may have limited or fluctuating availability and bandwidth. Delivery of electronic mails to the user and their successful receipt and presentation on the display unit of the remote client are frequently a source of uncertainty.

Document EP 2-144-409-B1 describes an example of a method for providing an electronic mail message in several parts to a mobile terminal in order to adapt to the low bandwidth and reduced storage capacity of such client terminals.

The present invention provides further improvements.

According to the invention, a method of the type in question is characterized in that said electronic mail server exchanges data with at least one storage server via a network, and in that it comprises a delivery step including the operations of:
receiving on the electronic mail server, from the remote client, a request for delivery of an electronic mail identified by an electronic mail identifier;
obtaining, from at least one storage server, data to be encapsulated and message attribute data, said data being associated with the electronic mail identifier;
generating the electronic mail from the data to be encapsulated and the message attribute data; and
transmitting the electronic mail to the remote client.

With these arrangements, an electronic mail is generated dynamically and sent when the remote client requests it. This electronic mail can thus be adapted to the client terminal. In addition, the performance of the electronic mail server is improved, one reason being that it does not need to store the electronic mails in memory.

In preferred embodiments of the invention, one or more of the following arrangements may possibly be used:
the operation of obtaining data to be encapsulated and message attribute data from at least one storage server comprises updating said data on the storage server;
the electronic mail server retrieves, from a storage server, technical specifications information associated with the remote client;
the operation of generating the electronic mail is performed based on the technical specifications information;
the operation of obtaining data to be encapsulated and message attribute data from at least one storage server is performed based on the technical specifications information;
the data to be encapsulated contain data selected from a list comprising: a voicemail message, a visual voicemail message, an image, a video, a sound recording, a fax, a scanned document, an event notification;
the method further comprises an authentication step performed before the delivery step and during which the electronic mail server identifies the remote client and retrieves from a storage server the technical specifications information associated with the remote client;
the storage server is accessible, by the remote client and via the internet network, solely through the electronic mail server.

The invention also relates to an electronic mail server delivering electronic mails on request to at least one remote client via an internet network, the electronic mail server exchanging data with at least one storage server via a network, the electronic mail server comprising:
a receiving unit for receiving a request from a remote client to deliver an electronic mail identified by an electronic mail identifier;
a communication unit for obtaining data to be encapsulated and message attribute data from at least one storage server, said data being associated with the electronic mail identifier;
a generation unit for generating the identified electronic mail from the data to be encapsulated and the message attribute data; and
a transmitting unit for delivering the identified electronic mail to the remote client.

The invention also relates to a computer program product comprising instructions suitable for implementing, when this program is executed by a processor of an electronic mail server connected to at least one remote client via an internet network and to at least one storage server via a network, the operations of:
receiving from a remote client a request to deliver an electronic mail identified by an electronic mail identifier;
obtaining, from at least one storage server, data to be encapsulated and message attribute data, said data being associated with the electronic mail identifier;
generating an identified electronic mail on the basis of the data to be encapsulated and the message attribute data; and
sending the identified electronic mail to the remote client.

In general, certain of these embodiments have one or more of the following advantages. It is possible by this method to send the client a variety of data in electronic mail form, such as voice or video messages, faxes, and event notifications such as missed calls. These data can be stored on the storage server in a different format than the electronic mail format, which eliminates having to adapt the storage server to its use. These data can be converted to an appropriate format for the remote client when the electronic mail is generated.

Other features and advantages of the invention will be apparent from the following description of one of its embodiments, given by way of non-limiting example, with reference to the accompanying drawings.

In the drawings.

In the various figures, the same references are used to denote identical or similar elements.

Figure 1:
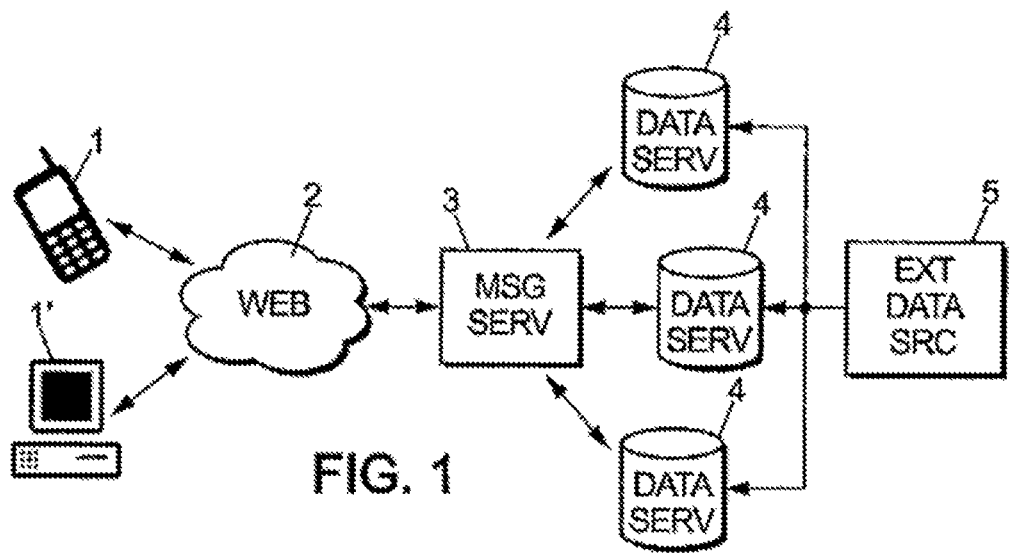
FIG. 1 is a block diagram illustrating a system for delivery of electronic mail on request, which can use a method for delivery of electronic mail on request according to the invention.

Referring first to FIG. 1, a system for delivering electronic mail on request may comprise one or more remote clients 1, 1' connected via an Internet network 2 to an electronic mail server 3, which is connected to at least one storage server 4.

In the following description, the terms "email", "message", "electronic mail", "electronic message", and terms derived from these will be used interchangeably.

For purely illustrative purposes, two remote clients 1 and 1' are represented in FIG. 1, but any number of remote clients can be used. The remote clients may be of different types. For example, a first remote client 1 illustrated in FIG. 1 consists of a mobile terminal that is a smartphone, while a second remote client 1' illustrated in FIG. 1 can consist of a desktop computer.

The remote client(s) 1 are connected to the electronic mail server 3 via the Internet network 2 and can exchange information using known Internet communication protocols such as TCP/IP (Transmission Control Protocol/Internet Protocol).

The remote clients 1 may be connected to the internet network 2 directly or via a router or firewall, for example in the case where said remote client 1 consists of a desktop computer.

Alternatively, the remote clients may access the Internet network 2 via a wireless wide area network or WWAN, also known as a mobile cellular network or terrestrial mobile network, or via a wireless local area network or WLAN.

The wireless network may for example comprise a plurality of mobile telephony cell towers, also referred to as base stations, each one allowing communication with mobile devices or remote clients located within a defined geographical area. The cell towers may be connected via routing equipment to a gateway which allows exchanging data with the Internet network. The network formed by the equipment may be one of the following types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), WiMax (Worldwide Interoperability for Microwave Access), or another type.

As a variant, the remote client 1 may comprise a desktop computer, a laptop computer, a touchscreen tablet, or any other electronic device without the ability to connect to said wireless network. The remote client 1 can then be connected to the wireless network via an external connection device, for example connected to the remote client 1 via one or a combination of: an Ethernet connection, a USB interface (acronym for Universal Serial Bus), a FireWire interface (also known as IEEE 1394), or some other interface for exchanging data serially, via the respective ports or the interfaces of the remote client.

The internet network 2 may comprise a local private network, a metropolitan area network or MAN, a wide area network or WAN, the Internet, or combinations of these, combinations which may for example include virtual private networks.

Figure 2A:
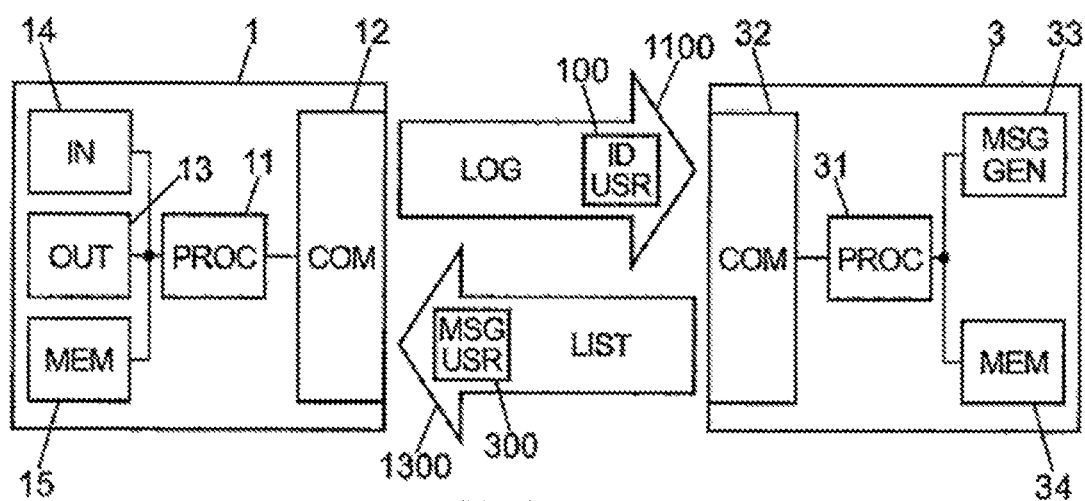
FIGS. 2a and 2b are block diagrams illustrating an embodiment of a method for delivery of electronic mail on request according to the invention, detailing the interactions between a remote client and an electronic mail server.
Figure 2B:
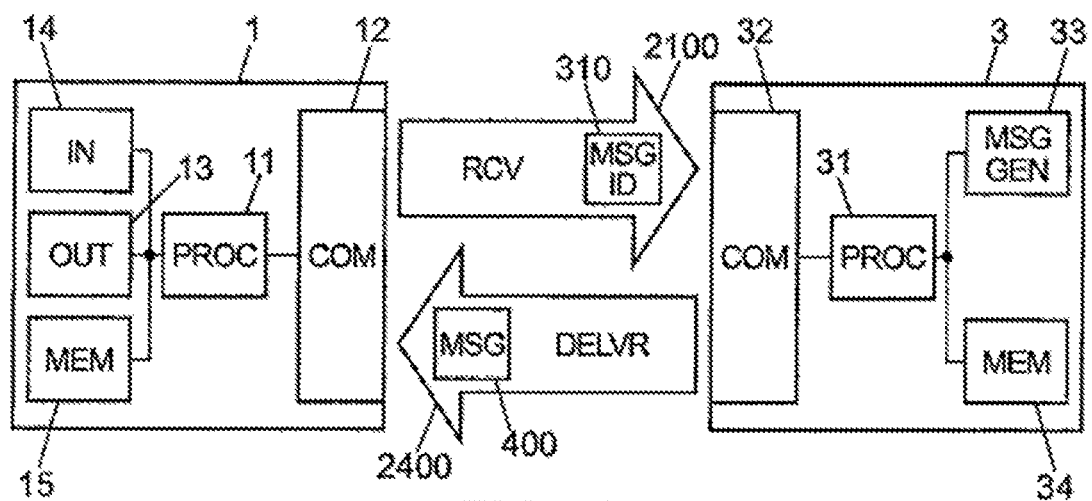

Referring now to FIGS. 2a and 2b as well, a remote client 1 may comprise a processor 11 which controls the general operation of the remote client 1.

In practice, the processor 11 may consist of one or more programmed microprocessors.

The processor 11 can interact with a communication module 12 which carries out the communication operations.

The processor 11 can also interact with additional peripheral modules that may optionally include but are not limited to output devices 13, input devices 14, and a storage module 15. The additional peripheral modules are not limited to the above list.

The output devices 13 may include a display module, for example a liquid crystal display (LCD) or a monitor, for example a cathode-based or digital display.

They may also include a module for audio output, for example such as a speaker or headphones.

The input devices 14 may include, for example, a keyboard, a mouse, a navigation device as one or more clickable scroll wheels, a trackball, a touchpad, a touchscreen, a microphone, or any other device allowing a user to send commands or information to the remote client.

The keyboard may be a full alphanumeric keyboard, or may be a reduced or simplified alphanumeric keyboard such as a telephone keypad for example.

In some embodiments, an input device 14 and a display module 13 can be implemented using a touchscreen comprising a display device with a touch-sensitive input surface.

The storage module 15 of the remote client 1 may comprise, for example, one or more random access memories (RAM), read-only memory (ROM), a hard drive (HDD), or any other medium for digital data storage.

The storage module 15 can be used to store local data on the remote client 1 such as electronic mails or electronic mail attachments.

In some embodiments, the storage module 15 consists of storage memory having a memory location reserved for storing electronic mails or electronic mail attachments.

The storage module 15 is represented as a single block in FIG. 2a for illustrative purposes, but it is evident that the storage module 15 can comprise a plurality of storage media including different types of memory as detailed above, for example ROM, RAM, and a hard drive.

The storage module 15 of the remote client 1 can also store other data, such as services data comprising information required by the remote client 1 to establish and control communication with the internet network 2 and the electronic mail server 3, for example network services data.

The storage module 15 of the remote client 1 can also store user data for software applications such as electronic mails, address and contact information, a calendar, text documents, image files, audio or video files, or any other user information conventionally stored on the remote client 1.

The data stored in the storage module 15 of the remote client 1 may be organized, at least partially, into a number of databases which for example each contain data of the same type or data associated with a certain software application of the remote client 1.

The processor 11 conventionally executes instructions of a program, also referred to as software, stored in the storage module 15 and can for example run software modules stored in the storage module 15.

These software modules can include a central program or operating system and software applications. The software modules or portions thereof called processes may be temporarily loaded into volatile memory such as random access memory (RAM) of the storage module 15.

The random access memory is also used to store variable data for execution or other types of data or information temporarily used during execution of an application or software module.

The software applications can include a variety of applications such as, for example, an electronic mail application, a voice mail application, a telephony communication application, a mapping application, a calendar application, a contact management application, and a media player application.

Note that the remote client 1 may comprise additional modules that are not represented in FIG. 2a but are well known to those skilled in the art, for example a power supply that may include an interface for connecting to the power grid or one or more rechargeable batteries.

The power supply conventionally provides electrical energy to at least a portion of the electrical circuitry of the remote client 1.

Figure 3:
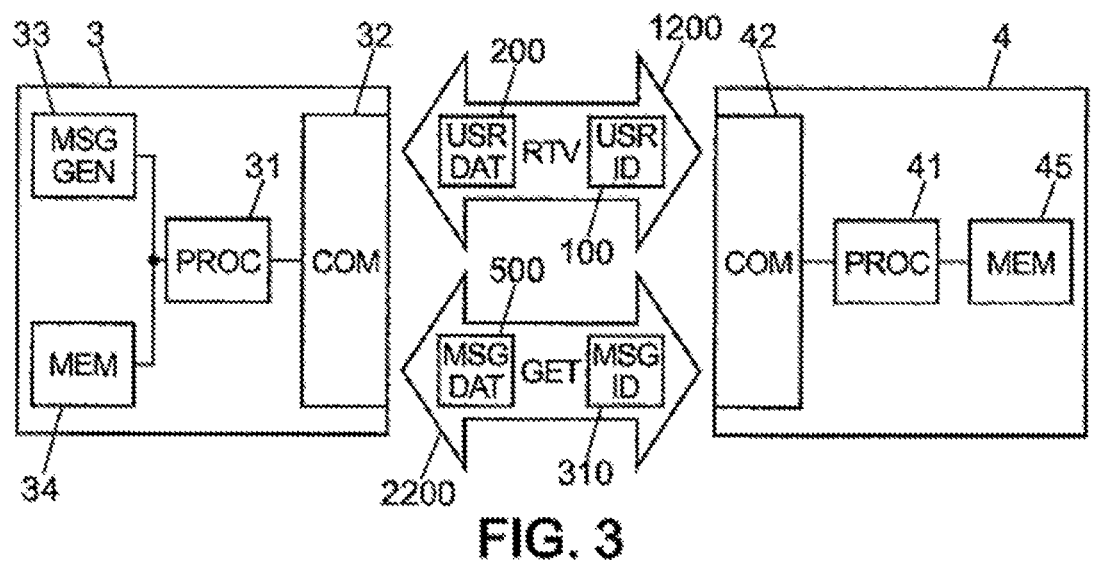
FIG. 3 is a block diagram illustrating one embodiment of a method for delivering electronic mail on request according to the invention, detailing the interactions between an electronic mail server and a storage server.

Referring in particular to FIGS. 2a, 2b and 3, an electronic mail server 3 will now be described in more detail.

The electronic mail server 3 can be implemented using any known server or computer and can, for example, be created by using one or more computers and/or servers running one or more software applications performing the functions described below.

The electronic mail server 3 is configured to implement a number of modules optionally including but not limited to: a control module 31, communication modules 32, an electronic mail generation module 33, and storage modules 34.

In one embodiment, the electronic mail server 3 may for example comprise one or more microprocessors that execute the instructions of one or more programs, also known as software applications, in order to implement said modules.

These programs or software applications may, for example, be stored in non-volatile or read-only memory of the electronic mail server 3.

The control module 31 can control the execution of the components and modules of the electronic mail server 3, launch them, shut them down, and restart them if necessary.

The communication modules 32 connect to the remote clients 1 and to the storage servers 4.

The communication modules 32 may be adapted to communicate with the remote clients 1 and storage servers 4 via a private local network, a metropolitan area network (MAN), a wide area network (WAN), the Internet, or combinations thereof, combinations which may for example include virtual private networks.

The control module 31, the communication modules 32, the electronic mail generation module 33, and the storage modules 34 may for example each be implemented by means of standalone software applications, or combined within one or more software applications, or as processes of another software application.

In some embodiments, the functions performed by each of the modules identified above may be performed in a plurality of independent modules rather than in a single integrated module, and one or more of these modules may be implemented as parts of other software applications.

A remote client 1 can, for example, control its electronic mailbox and exchange electronic mails with the electronic mail server 3 using a protocol for viewing, retrieving, and/or sending electronic mail such as IMAP (Internet Mail Access Protocol) or a derivative protocol.

Alternatively, the POP protocol (Post Office Protocol) may be used.

A storage server 4 will now be described in more detail, with particular reference to FIG. 3.

Similarly to the electronic mail server 3, the storage server 4 can be implemented using any known server or computer and can, for example, be implemented by using one or more computers and/or servers and executing one or more software applications providing the functions described below.

The storage server 4 is configured to implement a number of modules, optionally including but not limited to: a control module 41, communication modules 42, and storage modules 45.

In one embodiment, the storage server 4 may for example comprise one or more microprocessors that execute the instructions of one or more programs, also known as software applications, in order to implement said modules.

These programs or software applications may, for example, be stored in non-volatile or read-only memory of the storage server 4.

The control module 41 can control the execution of the components and modules of the storage server 4, launch them, shut them down, and restart them if necessary.

The communication modules 42 can connect to and exchange data with the electronic mail server 3 and external data sources 5, for example via a wireless wide area network (WWAN) also known as a mobile cellular network or mobile terrestrial network, a wireless local area network (WLAN), a private local network, a metropolitan area network (MAN), a wide area network (WAN), the Internet, or combinations thereof, combinations which may further include virtual private networks.

The external data sources 5 may include a variety of source terminals of different types depending on the data stored in the storage server 4.

Purely as an illustration, a storage server 4 of a voicemail system, suitable for storing voice messages, can have, as external data sources 5, telephones connecting to said storage server via a telephone network.

The electronic mail server 3 connects to the communication modules 42 of a storage server 4 by means of a web service, for example by using a protocol such as OSA, SOAP, REST, XML-RPC, or a combination of these protocols.

Any suitable data exchange protocol can be used for the communication between the electronic mail server 3 and the storage servers 4.

The control module 41, the communication modules 42, and the storage modules 45 may for example each be implemented by means of standalone software applications, or combined within one or more software applications, or as processes of another software application.

In some embodiments, the functions performed by, each of the modules identified above may be performed in a plurality of independent modules rather than in a single integrated module, and one or more of these modules may be implemented as parts of other software applications.

Advantageously, the storage server or servers 4 may be accessible by the remote client 1 via the internet network 2 solely through the electronic mail server 3.

A user of a remote client 1 therefore cannot directly access the storage servers 4 via the internet network 2.

In this manner, the storage servers 4 can be protected from security breaches.

A method for delivering electronic mails on demand will now be described in more detail, with reference to FIG. 4 as well.

This method comprises a delivery step 2000 which may be preceded by a connection step 1000.

Figure 4:
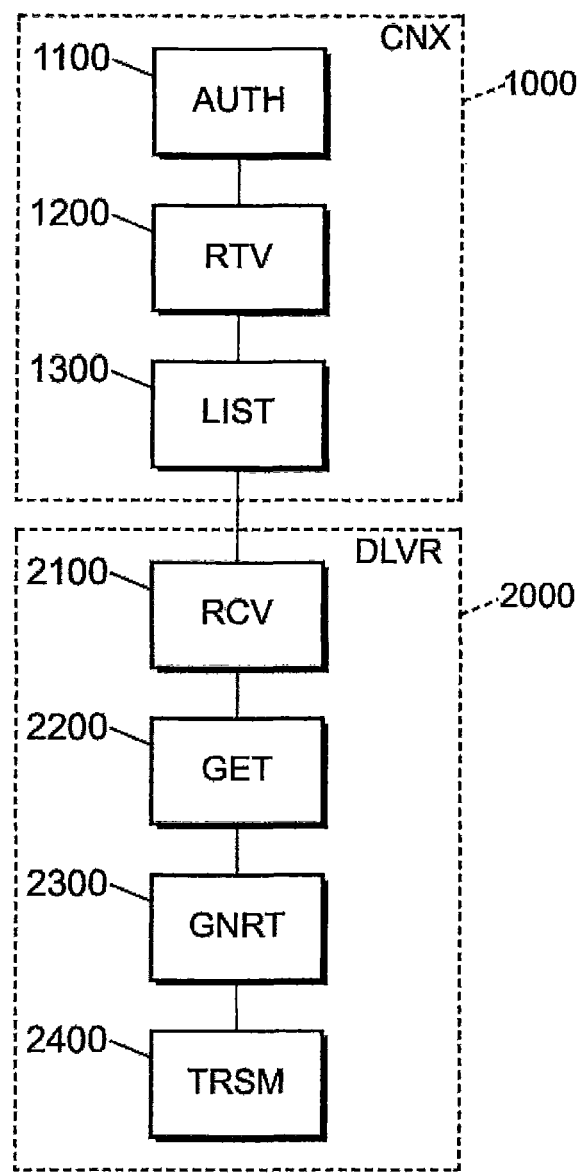
FIG. 4 is a flowchart illustrating an embodiment of a method for delivering electronic mail on request according to the invention.

Referring in particular to FIGS. 2a and 4, the connection step 1000 may include a first authentication operation 1100 during which the remote client 1 identifies itself to the electronic mail server 3.

The authentication operation 1100 may, for example, include the transmission to the electronic mail server 3 of user identifiers 100 which may comprise, for example, a user name 110 and a password 120.

In some embodiments, for example when the network 2 is an non-secure network such as the Internet, the user identifiers 100 may advantageously be communicated in encrypted form.

Communications can be secured by using a secure transfer protocol, such as the Transport Layer Security (TLS) protocol.

The remote client 1 can then request opening a secure session, such as a TLS session, prior to sending the user identifiers 100.

The communications can then be encrypted using a symmetric encryption key, for example by means of AES type algorithms (AES stands for "Advanced Encryption Standard"), or Triple DES type algorithms ("Triple Data Encryption Standard").

Private encryption keys can be generated in a protected environment and used for data encryption and decryption.

In one embodiment of a method according to the invention that includes such a secure TLS session, the remote client 1 can, before requesting the opening of a TLS session, ask the electronic mail server 3 to list its capabilities in order to verify that the electronic mail server 3 has the ability to communicate via a secure TLS session.

The authentication operation 1100 can be implemented using a protocol for viewing, retrieving, and/or sending electronic mail such as the IMAP protocol (the acronym for "Internet Message Access Protocol") or the POP protocol (the acronym for "Post Office Protocol").

Once the electronic mail server 3 has obtained the user identifiers 100, it can compare them with reference identifiers 130 stored in memory. The reference identifiers 130 could also be stored on a remote server, for example a storage server 4.

If the user identifiers 100 are identical to the reference identifiers 130, the remote client 1 can be identified.

During a second operation 1200, the electronic mail server 3 can obtain technical specifications information 200 from a storage server 4. This technical specifications information 200 is advantageously associated with the user identifiers 100 of the remote client 1, for example by means of a database 299 of a storage server 4.

The technical specifications information 200 may, for example, include hardware information 210 concerning the electronic hardware of the remote client 1 and software information 220 concerning the software applications installed on said remote client 1 and/or the operating system of said remote client 1.

It may also include information 230 concerning the user of the remote client 1, for example the language in which the user wishes to read messages.

Finally, it may include information 240 configured by the user of the remote client and indicating for example how the user wishes to access electronic mail through the remote client 1, for example with or without the display of images.

During an optional third operation 1300, the remote client 1 can obtain a list of messages 300 contained in the electronic mailbox or in a directory within the electronic mailbox, for example the directory corresponding to the Inbox.

The remote client 1 can send a request to the electronic mail server 3, for example a request for a list of messages, according to a protocol for viewing, retrieving, and/or sending electronic mail messages such as the IMAP protocol (the acronym for "Internet Message Access Protocol"), or the POP protocol (the acronym for "Post Office Protocol").

This list of messages 300 may contain one or more electronic mail identifiers 310 each associated with an electronic mail 400 in the electronic mailbox.

The electronic mail server 3 can use the technical specifications information 200 when generating the list of messages 300.

As an example, the electronic mail server 3 can then select for inclusion, in the list of messages 300, only those messages that are readable by the remote client 1.

After the connection step 1000, the delivery step 2000 consists of, generally and without limitation, the electronic mail server 3 delivering to a remote client 1 an electronic mail 400 requested by the client. This step can also include other operations and will now be detailed further.

The delivery step 2000 includes a first operation 2100 of receiving, on the electronic mail server 3, an electronic mail identifier 310 sent by a remote client 1.

This electronic mail identifier 310 may, for example, include a set of alphanumeric characters or a code identifying the electronic mail message 400 requested by the remote client 1 at the time of the receiving operation 2100.

This electronic mail identifier 310 can be changed over time by the electronic mail server 3, for example when the electronic mail message 400 is moved between directories in the electronic mailbox, but identifies the electronic mail 400 requested by the remote client 1 at the time of the receiving operation 2100.

Then, during a retrieval operation 2200, the electronic mail server 3 retrieves electronic mail generation data 500 from one or more storage servers 4.

The electronic mail generation data 500 may advantageously be associated with the electronic mail identifier 310, for example by means of a database 599 of the storage server 4.

The electronic mail generation data 500 may also be associated with the identifier of the remote client 310, for example by means of a database 598 of a storage server 4.

The electronic mail generation data 500 may contain data to be encapsulated 510, for example a voice message or visual message, an image or a video, a sound recording, a fax or scanned document, an event notification, for example notification of a missed call, and/or any other data intended to be encapsulated in the electronic mail 400 or linked to the electronic mail 400, for example in the form of an attachment 410 using the MIME exchange protocol (acronym for "Multipurpose Internet Mail Extensions") or S/MIME protocol (for "Secure/Multipurpose Internet Mail Extensions."

The electronic mail generation data 500 may also include message attributes 520 defining generation parameters for the electronic mail 400.

The message attributes 520 may define the language in which the message is to be generated, the parameters related to the subject line, to the message body, to the message sender.

The message attributes 520 may define parameters for generating electronic mail headers 420.

The retrieval operation 2200 may also include updating the electronic mail generation data 500 on the storage server.

This update may consist of updating the status of the electronic mail generation data 500, for example in a database, moving the electronic mail generation data 500 to another directory of a storage module 45 of the storage server 4, or modifying the electronic mail generation data 500 on the storage server 4.

For purely illustrative purposes, in an embodiment where the storage server 4 is part of a voicemail system and is suitable for storing voice messages, the electronic mail generation data 500 may include voicemail and the updating of said electronic mail generation data 500 may include archiving said voice messages.

Next, a third operation 2300, the generation operation, can include the generation by the electronic mail server 3 of the electronic mail message 400 associated with the electronic mail identifier 310.

The generation operation 2300 is advantageously carried out based on the technical specifications information 200 and/or electronic mail generation data 500.

The generation operation 2300 includes generating headers 420 for the electronic mail message 400, for example headers specifying the subject, recipient, sender, date, return address, a secondary identifier for the message, the electronic mail priority, variables or identifiers for MIME or HTTP versions, type of content, a content identifier, type of encoding, variables or version identifiers for software applications, and/or any other useful electronic mail field.

The generation operation 2300 may also include generating the body 430 of the electronic mail 400.

Generation of the body 430 of the electronic mail can include generating message text, images, video, animations, and/or sounds to be included in the electronic mail body 430.

The body 430 of the electronic mail may, for example, be generated in a language specified by the technical specifications information 200 and/or the message attributes 520.

As a non-limiting illustration, the software information 220 concerning the software applications installed on said remote client 1 may indicate that the remote client 1 has a specific software application for reading messages having an attachment that includes a voice message.

The electronic mail 400 can then be generated to meet the requirements of the software application, for example by means of the appropriate headers 420 or message body 430.

In another embodiment, and again as a non-limiting illustration, the technical specifications information 200 may indicate that the remote client 1 accesses messages using a known electronic mail client such as IBM Lotus Notes, Apple Mail, Microsoft Outlook, or Mozilla Thunderbird for example.

The electronic mail 400 can then be generated so that it is readable and understandable by a human user, for example by means of the appropriate headers 420 and/or message body 430.

The generation operation 2300 may further comprise the generation or adaptation of one or more attachments 410 to the message.

To provide another example of a non-limiting illustration which allows a better understanding of the advantages of the invention, the technical specifications information 200 may indicate one or more attachment 410 formats that the remote client 1 is able to present to the user: for example, in the case of a voicemail, one or more audio data formats that the remote client 1 can stream through its output peripheral 13, such as a speaker.

The generation operation 2300 can then include the adaptation by transcoding of data to be encapsulated 510 so as to generate an attachment 410 in a format readable by the remote client 1.

Finally, the generation operation 2300 may include the concatenation of headers 420, message body 430, and attachments 410 to form the electronic mail 400.

Following the generation operation 2300, a transmission operation 2400 comprises sending the generated electronic mail 400 from the electronic mail server 3 to the remote client 1.

This transmission can be done via the internet network 2 and for example using a protocol for viewing, retrieving, and/or sending electronic mail messages such as the IMAP protocol (acronym for "Internet Message Access Protocol") or the POP protocol (for "Post Office Protocol").

In general, communications between the remote client 1 and the electronic mail server 3 can be carried out using a protocol for viewing, retrieving, and/or sending electronic mail such as the IMAP protocol (acronym for "Internet Message access protocol") or the POP protocol (acronym for "Post Office Protocol").

The embodiments of the invention described above are described only as examples.

Those skilled in the art can make modifications and combinations of specific embodiments without departing from the scope of the present invention.

In particular, the characteristics of one or more of the embodiments described above can be selected and combined to create variant embodiments comprising feature subsets that are not explicitly described above.

In addition, the characteristics of one or more of the embodiments described above can be selected and combined to create variant embodiments comprising combinations of features that are not explicitly described above.

The features adapted for such combinations and sub-combinations will be evident to those skilled in the art, upon review of the invention as a whole.

The object of the invention is also to be understood as covering all appropriate changes in technology, in particular changes to the computer protocols mentioned above.

The invention claimed is:

1. Method for delivering electronic mails on request from an electronic mail server to at least one remote client via an internet network, the method being characterized in that said electronic mail server exchanges data with at least one storage server via a network, and in that it comprises a delivery step including the operations of:

receiving on the electronic mail server, from the remote client, a request for delivery of an electronic mail identified by an electronic mail identifier wherein the electronic mail identifier is included in the request from the remote client;

the electronic mail server responding to the request from the remote client without storing the electronic mail in memory by:

obtaining, on the electronic mail server, from at least one storage server, data to be encapsulated and message attribute data, said data being associated with the electronic mail identifier of said request received from said remote client, along with technical specifications information for the remote client; said technical specifications information including:

hardware information concerning the electronic hardware of said remote client, software information concerning the software applications installed on said remote client and/or the operating system of said remote client, a language in which the user wishes to read messages, and/or information configured by the user of said remote client indicating if the user wishes to access electronic mail through said remote client with or without the display of images;

based on the technical specifications information for the remote client, and based on the request for delivery from the remote client, dynamically generating, by the electronic mail server, the electronic mail in a form adapted for the remote client from the data to be encapsulated and the message attribute data; and transmitting the dynamically generated electronic mail from said electronic mail server to the remote client.

2. Method for delivering electronic mails on request according to claim 1, wherein the operation of obtaining data to be encapsulated and message attribute data from at least one storage server comprises updating said data on the storage server.

3. Method for delivering electronic mails on request according to claim 1, wherein dynamically generating the electronic mail in the form adapted for the remote client comprises generating headers for the electronic mail.

4. Method for delivering electronic mails on request according to claim 1, wherein dynamically generating the electronic mail in the adapted for the remote client comprises generating one or more of:

(i) headers of the electronic mail message; and
(ii) a body of the electronic mail message;

based on client software information from the technical specifications information for the remote client.

5. Method for delivering electronic mails on request according to claim 1, wherein the operation of obtaining data to be encapsulated and message attribute data from at least one storage server is performed based on the technical specifications information.

6. Method for delivering electronic mails on request according to claim 1 wherein the data to be encapsulated contain data selected from a list comprising: a voicemail message, a visual voicemail message, an image, a video, a sound recording, a fax, a scanned document, an event notification.

7. Method for delivering electronic mails on request according to claim 1, wherein it further comprises an authentication step performed before the delivery step and during which the electronic mail server identifies the remote client and retrieves from a storage server the technical specifications information associated with the remote client.

8. Method for delivering electronic mails on request according to claim 1, wherein the storage server is accessible, by the remote client and via the internet network, solely through the electronic mail server.

9. Electronic mail server delivering electronic mails on request to at least one remote client via an internet network, the electronic mail server exchanging data with at least one storage server via a network, the electronic mail server comprising a processor and a memory storing instructions executable by the processor and operable to configure the electronic mail server to perform operations of:

receiving a request from a remote client to deliver an electronic mail identified by an electronic mail identifier, wherein the electronic mail identifier is included in the request from the remote client;

responding to the request from the remote client without storing the electronic mail in memory by:

obtaining data to be encapsulated and message attribute data from at least one storage server, said data being associated with the electronic mail identifier, along with technical specifications information for the remote client;

said technical specifications information including:

hardware information concerning the electronic hardware of said remote client, software information concerning the software applications installed on said remote client and/or the operating system of said remote client, a language in which the user wishes to read messages, and/or information configured by the user of said remote client indicating if the user wishes to access electronic mail through said remote client with or without the display of images;

based on the technical specifications information for the remote client, and based on the request for delivery from the remote client, dynamically generating the electronic mail in a form adapted for the remote client from the data to be encapsulated and message attribute data; and transmitting the dynamically generated electronic mail to the remote client.

10. Computer program product comprising instructions stored on a non-transitory computer readable medium suitable for implementing, when this program is executed by a processor of an electronic mail server connected to at least one remote client via an internet network and to at least one storage server via a network, the operations of:

receiving on the electronic mail server from a remote client a request to deliver an electronic mail identified by an electronic mail identifier, wherein the electronic mail identifier is included in the request from the remote client;

the electronic mail server responding to the request from the remote client without storing the electronic mail in memory by:

obtaining, from at least one storage server, data to be encapsulated and message attribute data, said data being associated with the electronic mail identifier, along with technical specifications information for the remote client;

said technical specifications information including:

hardware information concerning the electronic hardware of said remote client, software information concerning the software applications installed on said remote client and/or the operating system of said remote client, a language in which the user wishes to read messages, and/or information configured by the user of said remote client indicating if the user wishes to access electronic mail through said remote client with or without the display of images;

based on the technical specifications information for the remote client, and based on the request for delivery from the remote client, dynamically generating the electronic mail in a form adapted for the remote client on the basis of the data to be encapsulated and the message attribute data; and sending the dynamically generated electronic mail to the remote client.

\* \* \* \* \*